Nov. 13, 1951 R. C. SWIGERD 2,574,718
FISHING REEL
Filed Dec. 6, 1949
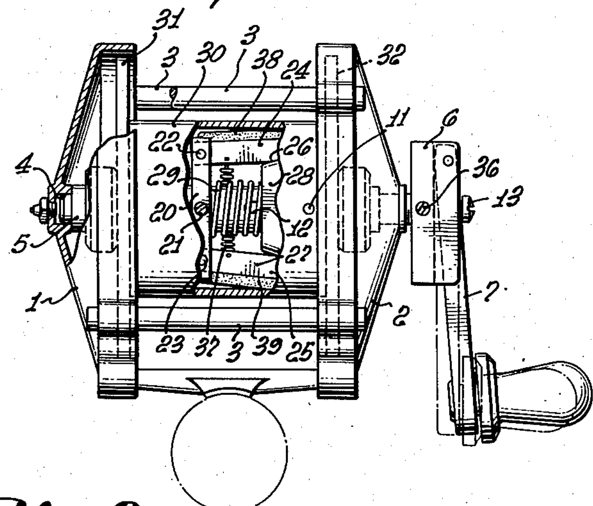
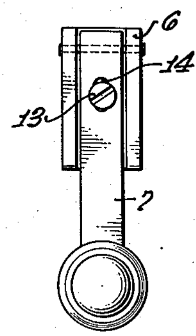
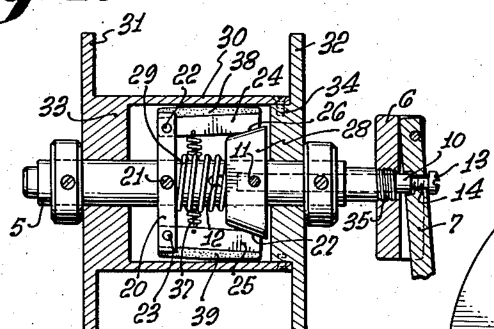
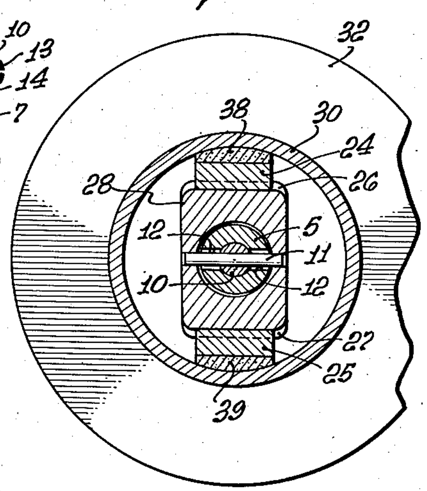
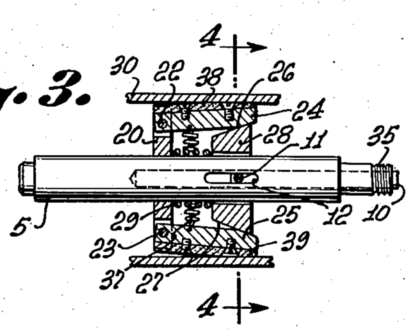
ROBERT C. SWIGERD,
INVENTOR.
BY O. O. Martin.
ATTORNEY.

Patented Nov. 13, 1951 2,574,718

UNITED STATES PATENT OFFICE 2,574,718

FISHING REEL

Robert C. Swigerd, Los Angeles, Calif.

Application December 6, 1949, Serial No. 131,340

2 Claims. (Cl. 242—84.5)

1

This invention relates to a fish line reel in which a reel shaft is mounted for rotation and in which a spool is mounted for rotation on said shaft. Frictional spool engaging means is placed between the shaft the inner surface of the spool and this means is actuated by a crank which is connected to rotate the shaft and to operate said means to engage the spool for rotation thereof or for yieldably restraining free rotation thereof.

The difficulty of this type of fish line reel operating mechanism is that while it can be depended upon effectively to connect the spool for rotation by the crank, it is found very difficult to make the frictional spool engaging means sufficiently sensitive delicately to respond to pulls on the fish line by a fish on the hook.

It is in view of the foregoing the object of the present invention to provide a fish line reel of the type referred to in which the frictional spool engaging means is so sensitive to any pull on the line and to slight adjustments of the hand crank that it can be depended upon to function perfectly when the fish is on the line.

The objects of the invention, as well as the advantageous features thereof, will be better understood from the following detailed description and by referring to the accompanying drawing in which a preferred form of the invention is illustrated.

In the drawings:

Fig. 1 is a general view of a fish line reel employing the invention and with parts thereof broken away in order better to illustrate the interior mechanism thereof;

Fig. 2 is a substantially corresponding view showing the manner in which the spool is mounted in position on the shaft of the reel and having the spool shown in section for the sake of clearness;

Fig. 3 shows the interior mechanism of Fig. 2 in a different position of adjustment;

Fig. 4 is a view on a larger scale taken substantially on line 4—4 of Fig. 3 in direction of the arrow; and Fig. 5 is a detail view of the crank by means of which the reel is operated.

The reel of the invention in the form illustrated in the drawing is of conventional form and outline, including end plates 1 and 2 which are rigidly maintained in spaced relation to each other by means of a series of bolts or rods 3 seated in perforated lugs of these end plates. The central portion of the plate 1 is internally recessed, substantially as indicated at 4, to receive therein the inner end of a shaft 5. The outer

2 end of this shaft extends through an axially aligned opening of the plate 2. A hub 6 is rigidly secured to the projecting end of the shaft and the outer surface of this hub is shown recessed to receive therein a crank 7 by means of which the shaft is rotated as required to control winding and unwinding of the line on the reel.

A hole is drilled into the outer end of the shaft of a size to receive therein a plunger 10 which extends at least half way into the shaft and is near the inner end thereof fitted with a transversely directed pin 11 the ends of which are seated to slide within an elongated transverse opening 12 of the shaft. The outer end of the plunger is internally threaded to receive a screw 13 which extends through an opening 14 of the crank for the purpose of connecting the plunger with the crank for axial sliding movement within the shaft in response to oscillations of the crank. It is to be noted that the opening 14 is somewhat elongated in order to permit of such sliding movement of the plunger without danger of binding within the opening of the crank during incidental oscillating movements of the latter.

A frame 20 is rigidly secured in position on the shaft as by means of a pin or screw 21 extending through the frame and the shaft. Pivots 22, 23 are seated in the outer ends of this frame in equidistantly spaced relation to the center of the shaft and these pivots serve to support brake shoes 24, 25 which ride on the inclined surfaces 26, 27 of a cam 28. A hole is drilled through this cam of a size tightly to receive therein the pin 11 which, as above stated, extends through the plunger and the elongated perforation 12 of the shaft. It is seen from this description that the cam 28 is tied to the plunger 10 for axial sliding movement therewith and it is further to be noted that a spring 29 is interposed between the cam and the frame 20 for the purpose or urging outward movement of the cam and plunger.

A spool 30 is mounted on the shaft to encompass the aforenamed elements on the shaft whereupon the end plates 1, 2 of the reel are placed on the shaft and tied together by means of the aforenamed bolts 3. In order to facilitate the assembling of the spool, the flanges 31, 32 thereof are fitted with shoulders 33, 34 of a diameter tightly to seat the body of the spool thereon. Once this assembly has been completed it is merely required to mount the crank assembly on the end of the shaft. For this purpose it is preferred to apply screw threads to the end of the shaft such as indicated at 35, for engagement with a threaded perforation of the hub 6.

It may be found desirable to place a set screw 36 in the hub which, when advanced against the screw threads of the shaft will maintain the hub unturned thereon. As above stated, the end of the plunger 10 extends through the elongated passage 14 of the crank hub to receive the screw 13 which then is tightly seated in the end of the plunger operatively to connect the plunger with the crank hub for axial sliding movement within the shaft.

As above stated, the outer ends of the brake shoes 24, 25, ride on the inclined surfaces of the cam 26 and the peripheral surfaces of these brake shoes should be fitted with suitable linings 38, 39 which normally are positioned to fit loosely within the drum. A spring 37 urges inward movement of the brake shoes on their pivots so as to prevent unnecessary friction of the shoes against the inner surface of the drum.

Normally the plunger 10 is by the spring 29 held outwardly projected and, while the parts remain in this position it is found that the spool is free to rotate on the shaft. This is found to be a great advantage in that it allows the line to play out when a fish is on the hook. When, on the other hand, it is desired to rotate the spool in either direction, it is merely required to swing the crank 7 on its pivot thereby to impart inward movement to the plunger 10 and so to force the brake shoes against the inner surface of the spool. It requires very little inward pressure against the crank to lock the spool so tightly on the shaft that no slipping is possible. On the other hand, it is also a very simple matter so to adjust the inward pressure against the crank that any desired relative movement between the shaft and the spool may be obtained such as required in order gradually to check playing off on the line as the resistance offered by the fish on the hook gradually decreases.

I claim:

1. In a fishing reel having a frame including end plates, a shaft seated for rotation in said frame and extending from one end thereof, a spool rotatably mounted on the shaft within the frame, a bracket on the shaft, brake shoes pivotally hung on said bracket for contact with the inner surface of the spool, a plunger slidable within the shaft, a cam on the shaft engaging the inner end surfaces of said brake shoes and operatively connected for inward sliding movement with said plunger to move said brake shoes against the surface of the spool, a spring between the brake shoes urging movement thereof against said cam, a crank mounted on the outer end of the shaft for oscillating movement relative thereto, and means interconnecting said crank with the said plunger to impart axial movement to the plunger in response to oscillation of the crank.

2. In a fishing reel having a frame including end plates, a shaft seated for rotation in said frame and extending from one end thereof, a spool rotatably mounted on the shaft within the frame, a bracket on the shaft, brake shoes pivotally hung on said bracket for contact with the inner surface of the spool, a plunger slidable within the shaft, a cam on the shaft engaging the inner end surfaces of said brake shoes and operatively connected for inward sliding movement with said plunger to move said brake shoes against the surface of the spool, a spring on the shaft between the bracket and the cam urging outward movement of the cam to release the brake shoes for retractive movement, a spring between the brake shoes urging movement thereof against said cam, a crank mounted on the outer end of the shaft for oscillating movement relative thereto, and means interconnecting said crank with the said plunger to impart axial movement to the plunger in response to oscillation of the crank.

ROBERT C. SWIGERD.

REFERENCES CITED

The following references are of record in the file of this patent:

UNITED STATES PATENTS

| Number | Name | Date |
| --- | --- | --- |
| 2,162,726 | King | June 20, 1939 |
| 2,257,023 | Ray | Sept. 23, 1941 |
| 2,513,689 | Swigerd | July 4, 1950 |